United States Patent [19]

Kreuter

[11] 4,238,516

[45] Dec. 9, 1980

[54] METHOD AND DEVICE FOR TREATING COCOA BUTTER-CONTAINING MASSES

[75] Inventor: Walter Kreuter, Norderstedt, Fed. Rep. of Germany

[73] Assignee: Kreucoha AG, Zug, Switzerland

[21] Appl. No.: 625,748

[22] Filed: Oct. 24, 1975

[30] Foreign Application Priority Data

Oct. 24, 1974 [DE] Fed. Rep. of Germany ....... 2450515

[51] Int. Cl.$^3$ .............................................. A23G 1/00
[52] U.S. Cl. .................................... 426/231; 426/233; 426/519; 426/520
[58] Field of Search ............... 426/231, 233, 519, 520; /Chemical Testing MS File; 9/DIG 10, 482

[56] References Cited

U.S. PATENT DOCUMENTS 3,384,003  5/1968  Sollich ............................ 426/520 X
3,638,553  1/1972  Kreuter .............................. 426/519

FOREIGN PATENT DOCUMENTS 1607802  7/1972  Fed. Rep. of Germany .
827727  2/1960  United Kingdom .

OTHER PUBLICATIONS

Food Engineering, Aug. 1951, pp. 147, 155, 156.

Susswaren, 14, 1968, pp. 775, 778.
Bohn, Biscuit and Cracker Production, 1957, American Trade Publ. Co., New York, pp. 169–171.
Cocoa and Chocolate Processing, Wieland, 1972, Noyes Data Corp., Park Ridge, N.J., p. 53.

Primary Examiner—Joseph M. Golian
Attorney, Agent, or Firm—Andrus, Sceales, Starke & Sawall

[57] ABSTRACT

A method and device of treatment of cocoa butter-containing masses, particularly molten chocolates, destined for subsequent processing, particularly in coating machines, the method comprising the steps of mildly cooling the mass from a first temperature of approximately 45° to 50° C. which is above the highest melting point of the mass to a second temperature at which pre-crystallization in the mass is initiated, sensing the occurrence of heat-producing processes in the mass during the cooling thereof, terminating the cooling upon the occurrence of such heat-producing processes, and thereafter mildly heating the mass, without overheating, to a third temperature of approximately 33° to 34° C., at which the mass is ready for said subsequent processing. The second temperature is thus automatically adjusted to the lowest possible value, which is desirable for the processing properties of the mass.

22 Claims, 16 Drawing Figures

METHOD AND DEVICE FOR TREATING COCOA BUTTER-CONTAINING MASSES

BACKGROUND OF THE INVENTION

It is known that cocoa butter-containing masses, particularly chocolate, which are processed in the molten condition, will develop, upon subsequent cooling and solidification, surfaces with desirable properties such as gloss, temperature resistivity, resistivity against fat-blooming, etc., only if the molten mass has been subjected to a certain preparatory or pre-crystallization treatment which frequently is called "tempering". Those processes usually consist of successive heating and cooling steps which take place within a narrow temperature range of a few degrees Celcius only.

It is known that it is useful for those tempering processes to heat the mass initially to a relatively high first temperature at which all cocoa butter crystals are certainly molten regardless of their crystal modification. That first temperature is preferably selected to be about 45° to about 50° C. The melt which has been made crystal-free in that manner is then inoculated with crystal nuclei. In this connection, it has been found that the frequently used prior method to form locally solidified chocolate in the mass by cooling with relatively cold water and to stir the solidified chocolate as an inoculating material into the mass will lead to strongly fluctuating results, whereby that process is only little suited for a rational mass production wherein predictable and reproducible processes must take place. Therefore, processes have become known wherein the mass is cooled mildly, i.e. without the use of cold water, from the said first temperature to a second temperature which particularly is about 28° to about 29° C. At that temperature, the mass is stirred, and its viscosity increases up to a maximum. Then the mass is mildly heated, without overheating, to a third temperature at which the mass can be processed. That third temperature frequently is chosen to be in the range of about 31° to about 32° C.; that temperature, however, may particularly also lie in the range of about 33° to about 34° C., as it is stated in connection with a particularly advantageous method utilizing a two-stage cooling. During the cooling from the first to the second temperature, and during holding the mass (while stirring) at the second temperature, a process of pre-crystallization is initiated, and it has been found that an exact selection of the second temperature can be of importance for the processing and solidifying properties of the molten mass. In practice, the exact value of the second temperature has been determined experimentally for the particular composition of the mass under consideration, or it has been determined experimentally how long a given amount of a certain mass has to be cooled at a certain cooling intensity to arrive approximately at the desired second temperature—in that case, the cooling process was controlled simply by means of a switch clock which after lapse of a predetermined cooling time caused switching to the subsequent heating to the third temperature.

The last-described empirical methods are not always reliable. When the particular value of the second temperature which is in fact used for a certain mass is too high, i.e. if switching to the heating towards the third temperature is premature, the mass will have deteriorated crystallization properties. Similar disadvantages will result also if the cooling is extended for too long a time.

SUMMARY OF THE INVENTION

The present invention starts from the object to provide a method by which the time at which the cooling is terminated can be determined and also kept automatic in a convenient and reliable manner so as to obtain optimum working and solidifying properties of the mass.

According to the invention, this object is attained with respect to the method by providing a method of treatment of cocoa butter-containing masses, particularly molten chocolates, which comprises the steps of mildly cooling the mass from a first temperature, particularly about 45° to 60° C., which is above the highest melting point of the mass, to a second temperature, particularly about 28° to about 29° C., at which a pre-crystallization is initiated, and thereafter mildly heating the mass, without over-heating, to a third temperature, particularly about 33° to about 34° C., at which the mass is ready for processing; the method is characterized by sensing heat-producing processes in the mass and terminating the cooling in dependence upon the occurrence of such heat-producing processes.

The method according to the invention takes advantage of the fact that changes take place in the mass which are accompanied by a heat-production if the mass is cooled too long or too deep a temperature. It is assumed that this involves the formation of crystals of undesired crystal modification, whereby the commencement of the heat production is directly an indication for the generation of crystal nuclei of undesirable crystal modification during the pre-crystallization. The so-called $\beta'$ modification which is said to have a melting point which is several degrees Celcius lower than in the case of the crystals of the desired $\beta$ modification is considered to be such an undesirable crystal modification. At this point, it should be expressly noted, however, that the invention and the advantages obtainable thereby are not dependent upon the correctness of any theoretical considerations.

In the method according to the invention, the occurrence of a heat production in the mass is used as a signal for terminating the cooling process, and it will be readily understood that also an automatic termination of the cooling process can be easily obtained by using said signal, the termination of the cooling process being in any case effected in a most simple manner by switching to the heating towards the third of processing temperature.

Thus, it is possible with the method according to the invention to proceed with the cooling exactly so far that a maximum concentration of crystallization nuclei of desired crystal modification is present in the mass, however, only few or no crystallization nuclei of undesired crystal modifications are present. In the method according to the invention, any random influences are principally obviated which have been unavoidable in the prior method of empirial determination of the second temperature, and it is possible to automatically take into account also influencing data, particularly the composition of the mass, which in the prior practice had to be taken into account empirically by means of experiments for every particular case.

The method according to the invention offers particular advantages for masses which had been subjected to preparatory treatments so that they can be stored at the third temperature over a long period of time at a practically unchanged viscosity. That relatively long storing of the mass is particularly necessary in coating machines wherein an excess quantity of the mass is conducted in a closed circuit and only the amounts which adhere to the coated articles are replaced by the supply of corresponding replenishing amounts. In the case of relatively long storage times, crystal nuclei of undesired crystal modifications which initially were present in a small amount only may cause the formation of larger and/or further crystals of the undesired modifications, and thereby the processing and solidification properties may gradually somewhat deteriorate over a longer period of time although the viscosity of the mass remains substantially unchanged. The above-described method for producing a mass which retains its viscosity at the processing temperature practically unchanged over long periods of time employs a plurality of cooling stages in each of which the mass is cooled with a heat exchange medium the temperature of which is only slightly lower than the final temperature of the mass in the respective cooling stage, and preferably only a single cooling process comprising two subsequent cooling stages is used; in that preferred kind of operation, a repeated heating is not necessary, and moreover the mass can be processed at a relatively high third temperature of about 33° to about 34° C. as a thin liquid. In such preparatory treatments comprising a plurality of cooling stages, the method according to the invention is applied so that the heat-producing processes in the last cooling stage are sensed.

The ideal case that the occurrence of heat production is completely avoided can be aimed at by treating a small proportion or partial current of the mass in the same manner as the main amount, however at a temperature which continuously is slightly lower, particularly by about 0.5° C., than the temperature of the main amount. Then, only that partial amount or partial current is checked for the occurrence of heat-producing processes, and as soon as such processes are sensed, the main amount which is still warmer than the partial amount or partial current by the predetermined temperature differential is further switched to heating towards the third or processing temperature. That mode of operation requires relatively expensive devices, particularly for maintaining the temperature differential between the main amount and the partial amount or partial current. Therefore, it will be desirable in most practical cases to prefer other embodiments wherein the occurrence of heat-producing processes is sensed directly in the main amount; in that case, it is of course not possible to avoid the heat-producing processes completely but practice has shown that the results which are obtained in this simplified manner are also satisfactory.

The occurring of heat-producing processes can be sensed in different ways; in general, the temperature changes which are caused thereby will be most convenient as the value to be sensed. In that respect, a particularly simple embodiment of the invention is characterized in that for sensing heat-producing processes in a terminal phase of the cooling, particularly upon attaining a temperature of the mass which is approximately 2° C. above the expected second temperature, the mass is cooled with a heat exchange medium of constant temperature, the cooling rate of the mass is observed, and the cooling is terminated when a reduction of the cooling rate is observed which indicates a heat production in the mass. It should be noted that also the remaining process parameters, particularly the pumping and stirring powers, are preferably kept unchanged.

The constant temperature of the heat exchange medium in the terminal phase of the cooling then may be the temperature which also in other cases is applied in the preparatory treatment in that particular step of the process; accordingly, in the case of usual chocolate masses and the use of the above-described particularly advantageous preparatory treatment operating with a two-stage cooling, that constant temperature in the terminal phase of the cooling process can be selected to be about 26° C. In accordance with process procedures which are usual also in other cases, it may be advantageous in the one or the other case to select a slightly different constant temperature of the heat exchange medium in the terminal phase of the cooling, depending upon the special process parameters applied in the particular case; as influencing parameters, particularly the composition of the mass and more specifically the cocoa butter content of the mass should be mentioned.

Monitoring the mass for the occurrence of an extraordinary reduction of the cooling rate lastly means sensing a timely change of the cooling speed, i.e. the second differential quotient of the temperature of the mass according to time. Suitable measuring devices may, for example, comprise an electrical temperature sensor, particularly a resistance thermometer or a thermo couple, which delivers an electrical temperature signal proportional to the temperature of the mass, furthermore two series-connected differentiating stages which produce from the temperature signal an output signal corresponding to the second derivative according to time of the temperature signal, and a subsequent switching stage which upon attaining a predetermined value of the second derivative of the temperature signal triggers a switching process which particularly may involve switching on from the cooling of the mass to the heating towards the third or processing temperature.

In that circuit, a particular advantage results from the fact that within the small temperature differential considered, the exponential cooling function may well be approximated by a linear function (as long as no heat-producing processes take place), so that the rate of change of the temperature is constant and thus the second derivative of the temperature according to time normally is approximately zero. Only upon the occurrence of the heat-producing process, the approximate linearity of the cooling function is significantly disturbed so that a finite value of the second derivative of the temperature of the mass according to time does appear. Thus, it will normally suffice in the just-described kind of sensing with the aid of the second derivative if the switching stage provided in the output simply is triggered if a finite value at all of the second derivative appears.

In spite of that principal simplicity, difficulties will arise in the practical utilization of such an arrangement because the processes considered proceed very slowly within very narrow temperature ranges, and thus very small signals in differentiating stages of very large time constants have to be processed in a measuring circuit. For example, in a normal preparatory or tempering treatment, the cooling rate may be 0.05° C. per minute, and upon occurrence of a heat production, that value may change, for instance, by 0.01° C. per minute per minute, whereby the second derivative according to time correspondingly is only 0.01° C./min$^{-2}$. Thus, although the relative variations of the cooling rate due to the occurrence of the heat production are relatively large, the absolute values of the temperature changes and rates of change are relatively small.

In view of this situation, it may be advantageous according to a further development of the invention to sense only the cooling rate itself, i.e. the first derivative of the temperature of the mass according to time, and to terminate the cooling process when the cooling rate of the mass falls below a predetermined value. Because of the already mentioned fact that the relative changes of the cooling rate upon the occurrence of a heat production are relatively large, the discrimination of the signal of the first derivative will not cause serious difficulties. If for instance in the terminal phase of the cooling, the temperature differential between the heat exchange medium and the mass at a certain point of time was 4° C., and at that time the cooling rate was 0.04° C. per minute, and if when upon attaining a temperature differential of 3° C. the cooling rate is only 0.02° C. per minute rather than the expected 0.03° C. per minute, this is a very clear indication that a heat production is going to take place. In a given device, the amount of the mass to be treated therewith is a fixed value, and also the temperatures, temperature differentials and other process parameters to be applied differ only slightly even with masses of different compositions. In contrast thereto, the effect of the heat production initiated in the mass on the cooling rate is relatively large, and thus it is possible in most cases for a given device and a given amount of mass therein to pre-set a fixed threshold value of the cooling rate and to terminate the cooling by switching over to heating towards the third temperature when the cooling rate falls below the pre-set threshold value. By the way, the choice of the threshold value will depend upon the particular process parameters applied, e.g. upon the amount of the mass filled into the device, the cooling capacity, the composition of the mass, etc., wherein it is readily possible with one and the same device and amount of mass to pre-set the essential process parameters as fixed values. The dependency from the composition of the mass, however, will become apparent only if the compositions are considerably different because it is just a characteristic of the method according to the invention that it is controlled in accordance with a reference value, i.e. the occurrence of a heat production, which reflects the properties of the mass which are determined by its composition.

It should be noted that the pre-set or threshold value of the cooling rate at which the cooling is terminated is related to the cooling rate which had to be expected in the mass without the heat production, or at a still useful approximation, to the cooling rate prior to the commencement of the heat production. Since the essential process parameters are sufficiently reflected in the cooling rate in the absence of a heat production, it is in most cases sufficient to select the threshold value simply as a fraction of the cooling rate which is expected in the absence of a heat production, particularly as approximately half that latter cooling rate. In tempering or pre-treatment devices which have a small cooling capacity only, which will be mostly the case in the interest of the desired mild cooling, the heat production starting in the mass even may cause a reduction of the cooling rate to approximately zero. In such cases, the threshold value of the cooling rate may simply be selected to be zero. Naturally, this means that the cooling is terminated relatively late, i.e. at a time when the heat-producing crystallization processes have proceeded relatively far. In general, therefore, a finite threshold value of the cooling rate will be preferred despite the somewhat higher expense.

The use of the cooling rate as a measure for the heat production in the mass offers the basic advantage that this is a value which may be sensed relatively easily and which is substantially independent of the absolute value of the temperature. Since, of course, the cooling rate is proportional to the driving temperature differential, i.e. that with a lower temperature of the heat exchange medium also a correspondingly higher cooling rate will be obtained, it is to the purpose to select the threshold value in dependence upon the selected constant temperature of the heat exchange medium in the terminal phase of the cooling process.

As will be apparent already from the foregoing explanations, a particularly simple device for performing the method according to the invention will be obtained if only the first derivative of the temperature is sensed. Accordingly, a device of that kind comprises as the most essential components a temperature sensor sensing the temperature of the mass, a differentiating device for differentiating the signal of the temperature sensor, and a threshold value circuit controlled by the output signal of the differentiating device, which will cause termination of the cooling upon the attainment of a value of the output signal which corresponds to a predetermined value of the cooling rate. Such a device can be readily put together from usual electrical components. Because of the slowness of the processes to be sensed, relative large time constants are required in the differentiating device which in the usual manner may contain a condenser-resistor combination, and this then means the use of relatively large resistances and capacities. In the practical realization, this may cause difficulties due to leak currents via insufficient electrical insulation. Such difficulties can be principally avoided if a sensing device is used which inherently responds directly to the rate of change of the temperature of the mass, whereby a differentiation in a subsequent evaluation device is no longer necessary. The application of such a sensing means thus offers very particular advantages just for the method according to the invention.

According to a further development a device for sensing the rate of change of the temperature of a mass, which device is particularly suited for application in the method according to the invention, may be basically designed so that two temperature sensing points are in heat-conducting connection with the mass via heat conductors of different time constants, and that a temperature differential sensing means responds to the temperature differential existing between the two sensing points and delivers a corresponding output signal which is used as a measure for the rate of change of the temperature. In such a device, there will be no output signal if the mass has a constant temperature because then the two sensing points will both be heated to the temperature of the mass. This will be the case with particular exactness if the sensing means is immersed into the mass, which will prevent heat losses from the temperature sensors to the environment. If the mass changes its temperature, the sensor which is connected with the mass via the heat conductor with the lower time constant will follow in its temperature to the temperature of the mass more rapidly than the other temperature sensor, and the appearing temperature differential then will be a measure of the rate of change of temperature of the mass.

The device described may be realized in different ways. For instance, the different time constants of the heat-conducting connections can be obtained merely by using sensing bodies which are of the same material but have different surface to volume ratios. Another very simple possibility consists in using sensing bodies of materials having different heat conductivities.

It is particularly advantageous if at least one of the two sensing bodies is at least in localized areas provided with a coating of low heat conductivity. Depending upon the design of that coating, the time constants associated with the two heat conductors can be adjusted differently in a very large range. Of course, it is also possible to provide both sensing bodies with low heat conductivity coatings of different effectiveness.

Since the temperature changes appearing are only small, it is particularly important to prevent disturbing of the sensing device by random local temperature differentials in the mass. It is thus particularly advantageous to provide the sensing bodies as parts of a unitary probe body destined for having the mass flowed therearound. A further improvement with a view to freedom of disturbances will result if the heat conductors are in heat-conducting connection with the mass in a common conducting area. That embodiment will become particularly simple if the one heat conductor forms part of the other heat conductor. This can be realized particularly by providing the sensing points in a probe body in two spaced areas, one of the areas being heat-insulated at its outer surface towards the mass, the probe body being adapted to have the mass flowing therearound.

BRIEF DESCRIPTION OF THE DRAWINGS

In the following, the invention will be described by means of examples and in connection with the drawings in which.

DESCRIPTION OF PREFERRED EMBODIMENTS

Figure 1:
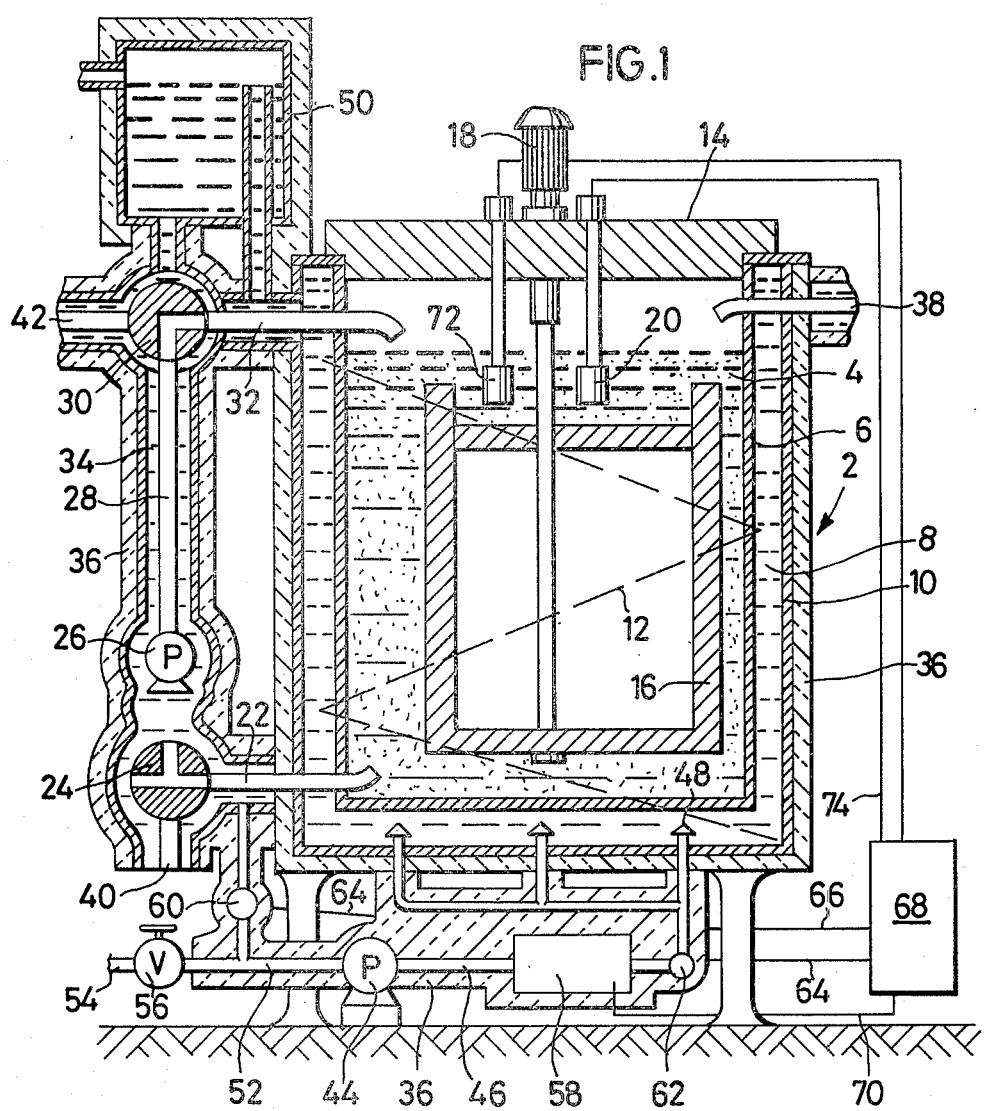
FIG. 1 shows a strictly schematical vertical sectional view of a tempering device suited for the method according to the invention, FIG. 2 a graphic illustration of the effect of a heat-producing process on the cooling curve, FIG. 3 a graphic illustration corresponding to FIG. 2 but for another cooling process, FIG. 4 a block representation of an evaluation circuit, FIG. 5 a block representation of a modified evaluation circuit, FIG. 6 a block representation of another evaluation circuit, FIG. 7 a detailed schematic block circuit of an evaluation circuit of the kind illustrated in FIG. 5, FIG. 8 a partial representation, corresponding to FIG. 7, of modified embodiment of an evaluation circuit, FIG. 9 a block representation of another embodiment of an evaluation circuit, FIGS. 10–13 schematic sectional views of various embodiments of sensing means, FIG. 14 a schematic sectional view of a sensing means responding to the rate of change of the temperature, FIG. 15 an illustration similar to FIG. 14, however, for another embodiment, and FIG. 16 a schematic circuit diagram of an evaluation circuit of the type shown in FIG. 5.

FIG. 1 illustrates in a strictly schematic vertical longitudinal sectional view the structure of a tempering device. It contains as an essential component a tempering vessel 2 in vertical arrangement. An amount of mass 4 is present in an interior container 6 and is in heat exchange relation with a heat exchange medium, preferably water, which is circulated in a jacket space 8 between the interior container 6 and an outer container 10. A conducting helix 12 is provided in the jacket space 8 to increase the flow velocity of the heat exchange medium and thus the uniformity of the heat transfer so that local temperature differentials within the mass 4 are avoided as far as possible.

A retractable lid 14 which is also made double-walled and can be supplied with the heat exchange medium (not shown) closes the vessel 2 and bears a stirrer 16 driven by a gear motor 18, a probe body 20 immersed into the mass 4 and serving for measuring the temperature of the mass and possibly also other values of state, and further devices, if required, which are not illustrated in FIG. 1.

During and after the tempering process, the mass 4 is continuously recycled between a discharge conduit 22 via a first three-way valve 24, a mass pump 26, a recirculating circuit 28, a second three-way valve 30, and a back flow conduit 32. All these parts are, as well as the vessel 2, surrounded by jacket spaces 34 through which the heat exchange medium is circulated, and a heat insulation 36 surrounds the vessel 2 and the said parts to eliminate as far as possible any disturbances of the tempering process by ambient temperature influences and heat losses. A heated feed conduit 38 is provided to supply mass to the vessel 2. The vessel can be emptied via the three-way valve 24 through an outlet 40, and a discharge line 42 is provided for delivering tempered mass and may be fed by a corresponding setting of the second three-way valve 30.

The heat exchange medium, preferably water, serves for heating and cooling of the mass. It is circulated in its own recirculation path: from the outlet of a recirculation pump 44, a heat exchange medium feed line 46 is fed which opens into the lower range of the jacket space 8 of the vessel 2 via a plurality of outlet openings 48. The heat exchange medium flows upwards in the vessel jacket space, under conduction of the conducting helix 12, and then flows via an overflow container 50 through the jacket spaces 34 of the second three-way valve 30 of the mass pump 26 and the first three-way valve 24, as well as through a heat exchange medium return circuit 52 connected to those jacket spaces 34 back into the inlet of the recirculation pump 34. A feed line 55 with a stop valve 56 is provided for feeding or discharging the heat exchange medium.

A heating and cooling device 58 is provided in the heat exchange medium feed line 46, and heat exchange medium temperature sensors 60 and 62 are arranged upstream of the recirculating pump 44 and downstream of the heating and cooling device 58, respectively, which sensors are connected via conduits 64 and 66, respectively, to a central control unit 68. The latter controls the heating and cooling device 58 via a connection 70 so that the temperature of the heat exchange medium is controlled in acordance with a predetermined program.

The heating and cooling device 58 is not described here at greater detail, it being noted that this device may comprise for instance two heat exchangers which are supplied with hot and cold water, respectively, and are controlled by means of control valves.

In addition to the measuring probe 20 already mentioned, further measuring and monitoring means may be provided, as particularly a level sensor (not illustrated) for sensing the filling level of the mass 4 in the vessel 2, and a separate temperature sensor 72 which is also connected to the central control unit 68 via a connection 74. Furthermore, there will be normally display devices (not illustrated) provided for the temperature of the mass, the temperature of the heat exchange medium and other values of state.

For instance, a typical tempering process can proceed in the tempering device illustrated in FIG. 1 by the aid of the central control unit 68 as follows:

At the beginning of the tempering process, the mass 4 is heated by means of the correspondingly heated heat exchange medium to a constant temperature of approximately 50° C, and the mass is continuously recirculated at that temperature by means of the mass pump 26. The temperature of the heat exchange medium is also 50° C. In that condition, the mass temperature is above the melting point of the highest-melting cocoa butter crystal modification so that the mass does not contain any cocoa butter crystals. That molten mass which is held homogeneous by the recirculation is then cooled by first cooling the recirculating heat exchange medium relatively rapidly, e.g. within half an hour, to an intermediate temperature which is not too low, e.g. to approximately 33° C. In that first cooling stage, the mass is cooled down with a corresponding delay. The temperature of the mass is communicated to the central control unit 68, e.g. from the temperature sensor 72. As soon as the mass has attained the desired intermediate temperature, which for instance may be the case after approximately two hours, the temperature of the heat exchange medium is further lowered to approximately 26° C., and the mass correspondingly cools down further in a second cooling stage. As soon as the mass has attained a definite second temperature, the heat exchange medium is heated to about 34° C., and the temperature of the mass will follow until finally the mass reaches a constant third temperature of also approximately 34° C.; at that temperature, the mass is ready for further processing and can be taken from the discharge conduit 42.

As the second temperature of the mass at which switching to the heating towards the third temperature is effected, the temperature is chosen at which a heat production is observed in the mass, which is due to undesired crystallisation processes. The reduction of the cooling rate of the mass, which is caused thereby, is sensed and measured and transferred into a switching order which initiates the heating towards the third temperature.

Figure 2:
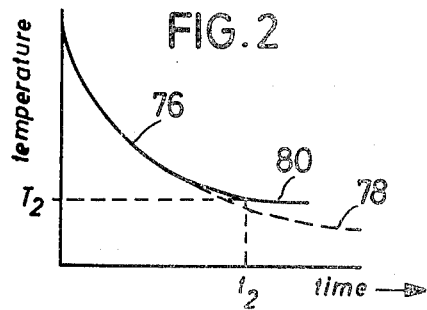

FIG. 2 shows strictly schematical in a temperature-time graph a cooling curve for the mass, it being assumed that the ordinate corresponds to the temperature. Initially, there results a normal exponential cooling curve 76. Without the occurrence of heat-producing processes, that curve would continue according to the dashed line 78. By the occurrence of a heat production, however, the cooling will be slowed down so that at a certain time t 2, the cooling rate or cooling velocity will be only a predetermined fraction of the cooling rate which normally would have to be expected at that time. As a consequence of the heat production, the temperature of the mass does not follow the dashed line 78 but, rather, the line 80. It is assumed in FIG. 2 that the cooling capacity is relatively low so that the cooling rate of the mass can drop due to the initiation of the heat production to approximately zero. However, already at an earlier time, i.e. at the said time t 2 at which the mass has the temperature T 2, the cooling process is terminated by switching on into the heating towards the third or processing temperature.

Figure 3:
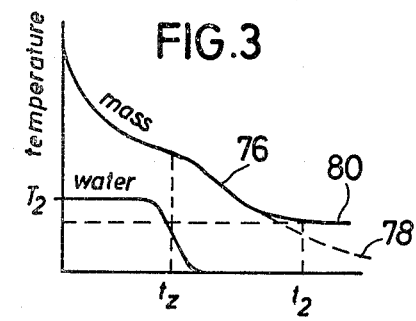

FIG. 3 shows in a similar representation as FIG. 2 a typical course of the temperature of the mass in the case of a two-stage cooling. At the time t z, the temperature of the water which here serves as the heat exchange medium is rapidly lowered, and the still higher mass temperature follows correspondingly and approximates exponentially the new lower water temperature. The cooling curve of the mass, however, finally does not take the dashed course 78 but the course 80 caused by the self-heating so that again at a time t 2 at which the mass has the temperature T 2, the cooling rate of the mass will be strongly reduced; as soon as that reduction is present, the process is switched on to the heating towards the third temperature.

Figure 4:
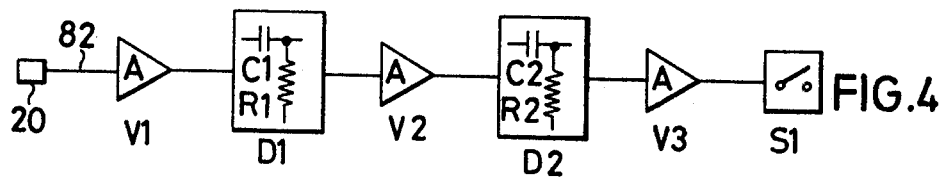

FIG. 4 illustrates the principal possibility to obtain a switching order for terminating the cooling from a measurement of the mass temperature. From a probe body 20 immersed into the mass, a temperature signal is delivered to a first amplifier V 1 via a connecting conduit 82. In the probe body 20, a transducer is provided, e.g. a thermo couple, a thermo battery or a resistance thermometer. The first amplifier V 1 delivers a correspondingly amplified electrical output signal to a differentiating stage D 1 which in known manner contains as effective components a RC combination consisting of a condenser C 1 and a resistor R 1. The differentiating stage D 1 supplies to an intermediate amplifier V 2 a signal which is proportional to the first derivative with respect to time of the temperature of the mass. The output signal of the intermediate amplifier V 2 is again differentiated in a second differentiating stage D 2 which contains as effective components a condenser C 2 and a resistor R 2, and the output signal which thus corresponds to the second timely derivative of the temperature of the mass, is supplied to a switching stage S 1 via a switching amplifier V 3. In the entrance of the switching amplifier, a signal will appear only if the rate of change of the mass temperature changes, and the appearance of such a signal triggers in the switching stage S 1 a switching process by which the central control unit 68 (see FIG. 1) is caused to increase the temperature of the heat exchange medium and thus initiates the heating of the mass towards the third or processing temperature.

Figure 5:
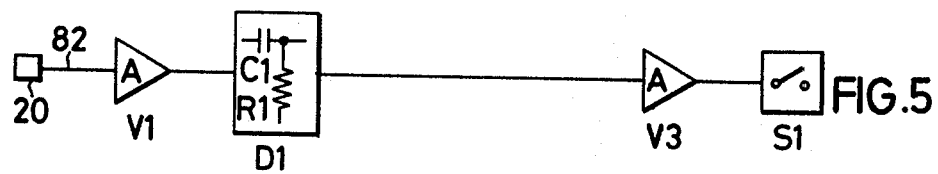

FIG. 5 illustrates a simplified possibility wherein the second differentiating stage D 2 is eliminated. In that case, the switching amplifier V 3 or the switching stage S 1 must have a discriminating effect, i.e. must trigger the desired switching process at a certain level of the output signal coming from the differentiating stage D 1. For example, a Schmitt trigger can be used for that purpose. Such a device, however, can also be disposed of if for example the switching stage S 1 is provided with a relay which simply drops and thereby triggers the switching process when the exitation current for that relay as delivered from the output of the switching amplifier V 3 falls below a certain value.

Figure 6:
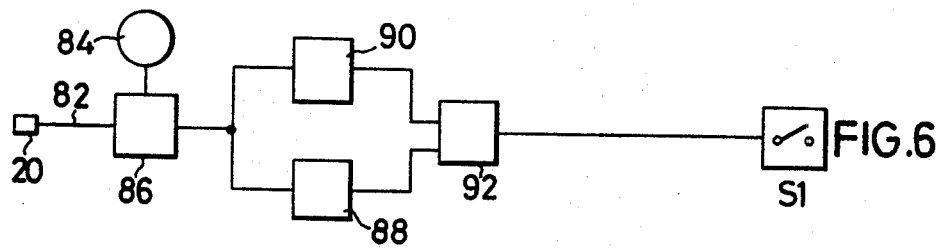

FIG. 6 illustrates a possible embodiment with a digital evaluating device. In that case, the electrical temperature signal delivered from the probe body 20 via the connecting line 82 is transposed in an entrance stage 86 into a digital signal, and the digital signal is under control of a cycling unit 84 periodically, e.g. every 15 seconds, fed into a store 88 and a delay device 90. The delay device 90 effects a delay by one cycle period or a plurality of cycle periods. The outputs of the store 88 and the delay device 90 are periodically compared in a comparator 92, and the digital differential signal appearing in the output of the comparator 92 controls a switching stage S 1.

Figure 7:
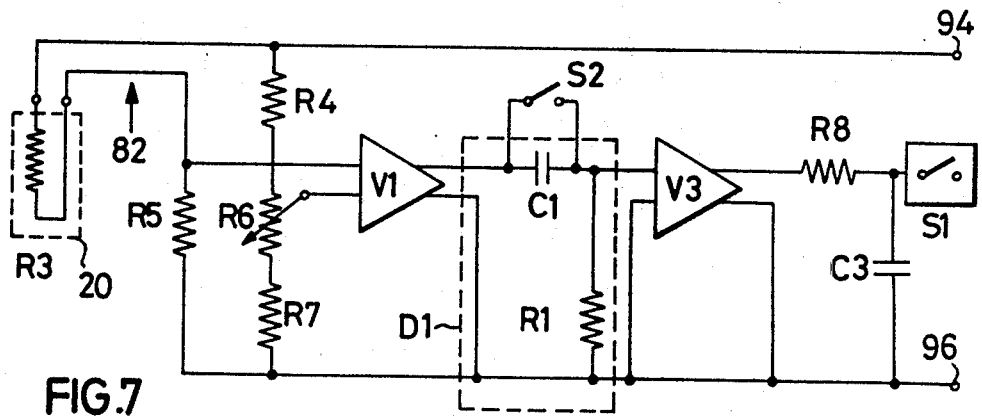

FIG. 7 illustrates in a somewhat more detailed block circuit diagram an evaluating circuit of the kind shown in FIG. 5. The probe body contains a resistance thermometer in form of a resistor R 3. Via the two-line connecting conduit 82, the resistor R 3 is arranged in a bridge circuit the other branches of which are formed by resistors R 4, R 5, R 6 and R 7. The resistor R 6 is an adjustable resistor and serves for adjusting the zero point. The bridge is fed with supply voltage via the terminals 94 and 96. The measuring voltage taken from the bridge diagonal is connected, in accordance with the schematic illustration in FIG. 5, to the input of a voltage amplifier V 1 the output of which is connected to the input of a switching amplifier V 3 via a differentiating stage D 1 consisting of the condenser C 1 and the resistor R 1. The output of the switching amplifier is connected to the switching stage S 1 via a filter circuit consisting of the resistor R 8 and the condenser C 3. The condenser C 1 of the differentiating stage D 1 can be short-circuited with a switch S 2; then a signal which directly corresponds to the temperature of the mass will appear at the output of the amplifier V 3. The switch S 2 may also be used to make the evaluation circuit operative only after the mass has reached a temperature which is only slightly above an expected second temperature.

This can be made also automatically, for instance by opening the switch S 2 by means of a relay controlled by the output of the switching amplifier V 3 when the said temperature slightly above the expected second temperature has been reached. Re-setting of the switch S 2 into the closed position can be effected by the switching stage S 1 upon triggering thereof.

Figure 8:
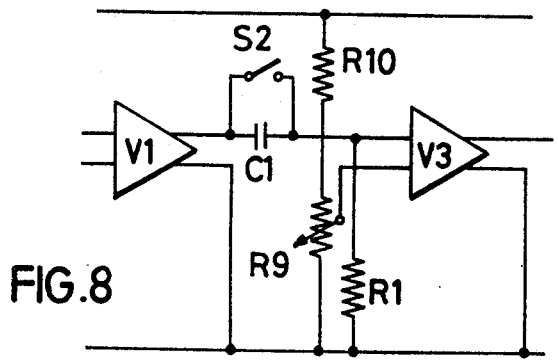

FIG. 8 illustrates a modified embodiment of the circuit according to FIG. 7, in which the input of the switching amplifier V 3 can be biased with an adjustable basic voltage obtained from a voltage divider R 9, R 10; thereby the switching point at which the switching stage S 1 is triggered may be varied.

The sensitivity of the differentiating stage will be the larger the larger the time constant of the RC member will be. Because of the slowness and low magnitude of the temperature changes sensed, it is to the purpose to select a time constant as large as possible; a limitation results from the requirement that the response speed must not be too low. In usual tempering processes, a time constant in the order of magnitude of one minute is to the purpose. This can be obtained, for example, with a condenser of 6 $\mu$F and a resistor of 10 MOhm. Of course, also switching means can be provided, if necessary, in order to rapidly switch between different time constants by selecting different condensers C 1 and/or resistors R 1.

In all other respects, the dimensioning of a practically useful circuit according to FIG. 7 will not be in any way difficult for a skilled artisan. For the amplifiers V 1 and V3, commercial operation amplifiers may be used, the amplification factors of which will have to be selected in accordance with the switching powers required in the switching stage S 1. For purpose of stabilization, negative feed back can be provided in the amplifiers; circuit particulars of that kind are not illustrated in FIGS. 7 and 8. The resistor R 3 may for instance take the form of a platinum resistance thermometer of 100 Ohm; in correspondence thereto, the remaining resistors of the bridge may have approximately the following values: R 5=100 Ohm, R 4=100 Ohm, R 6=50 Ohm, R 7=100 Ohm. The filter in the output of the switching amplifier V 3 can be dimensioned in various ways according to the kind of possible disturbing influences which are to be suppressed; it being understood that the time constant of that filter should be small as compared with the time constant of the differentiating stage D 1. If for instance the time constant of the differentiating stage D 1 is approximately one minute, one may select R 8=50 kOhm and C 3=50 $\mu$F which corresponds to a time constant of 2.5 seconds.

Figure 9:
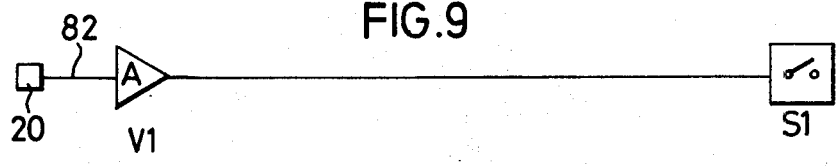
Figure 10:
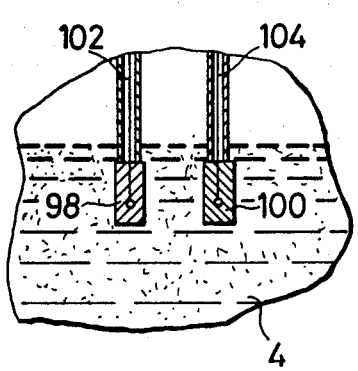

FIG. 9 illustrates in a schematic block representation similar to FIGS. 4 and 5 the basic structure of an evaluating device in case that a sensing means is provided in the probe body 20, which responds directly to the rate of change of the temperature of the mass, whereby already the primary signal fed into the connecting line 82 will directly correspond to the rate of change of the temperature. Then, differentiating stages are not necessary, and it is principally sufficient to provide an amplifier V 1 and a subsequent switching stage S 1 to obtain the desired effects.

Figure 11:
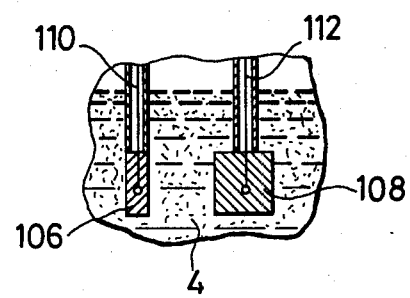

FIGS. 10 to 13 illustrate various simple possibilities to obtain a signal which corresponds directly to the rate of change of the temperature of the mass. According to FIG. 10, two sensing bodies 98 and 100 are immersed into the mass 4, which bodies consist of materials of different heat conductivity and comprise in both cases in the center a temperature sensing element which delivers an electrical temperature signal via a conduit 102 and 104, respectively. Because of the different heat conductivities of the materials of the two sensing bodies 98, 100, different time constants will result for the heat transport from the mass 4 to the temperature sensing elements, and the differential of the signals delivered via the lines 102 and 104 thus is a measure for the rate of change of the temperature of the mass 4. A somewhat different possibility is illustrated in FIG. 11. There, sensing bodies 106 and 108 are provided which consist of the same material but have different masses. Also in those sensing bodies, sensing elements are arranged which deliver electrical temperature signals via lines 110 and 112, respectively, the difference of which is a measure for the rate of change of the temperature of the mass 4.

Figure 12:
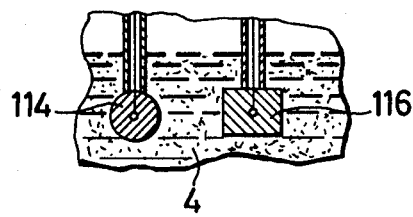
Figure 13:
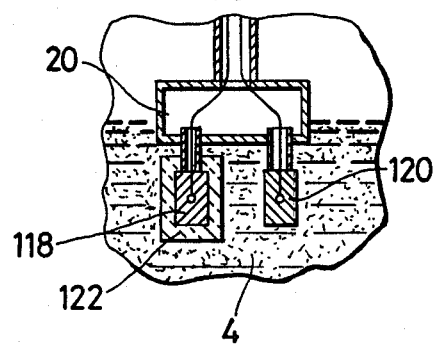

FIG. 12 illustrates the possibility of use two sensing bodies 114, 116 which have different surface to volume ratios; also thereby, a difference of time constants is obtained. The structure according to FIG. 13 is particularly effective. A probe body 20 has two sensing bodies 118 and 120 immersed into the mass 4. The sensing body 118 is surrounded by a heat insulation 122 which forms a certain heat resistance between the mass 4 and the sensing body 118. The sensing body 120 is directly immersed in the mass 4. It is readily apparent that thereby a large difference of the time constants associated with the two sensing bodies can be obtained.

Figure 14:
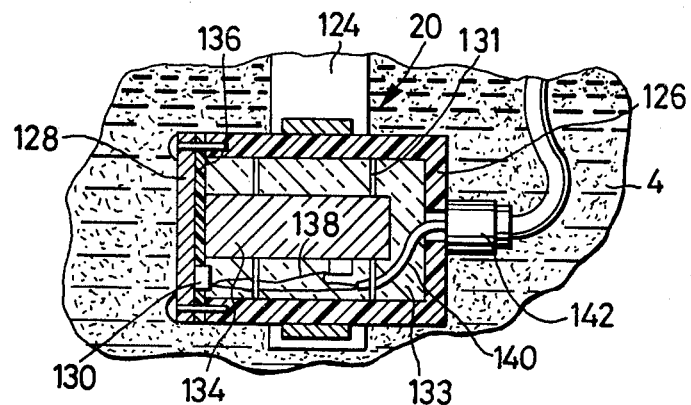
Figure 15:
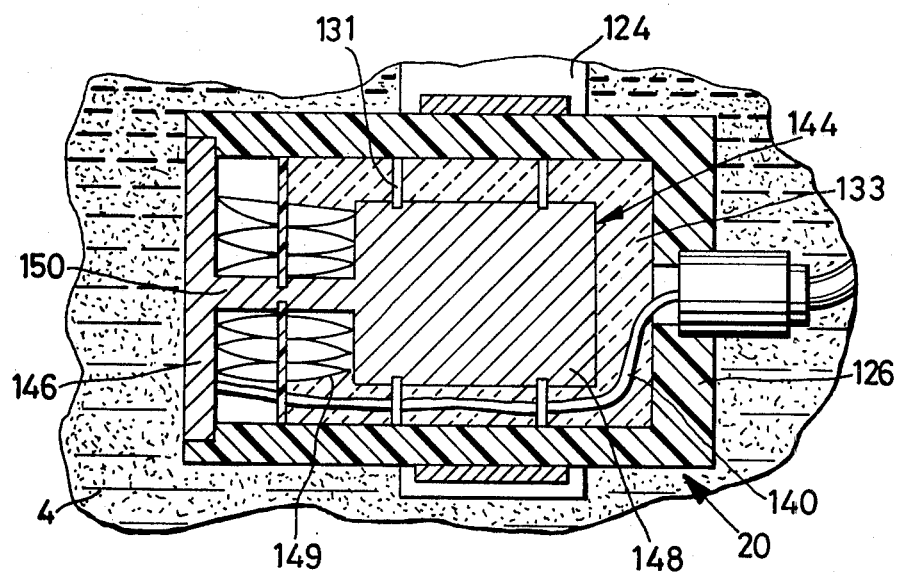

In order to avoid disturbing influences due to local temperature differentials in the mass, it is recommendable to operate devices of the kind shown in FIGS. 10 to 13 so that both sensing bodies are in heat-conducting connection with the mass 4 in a common contacting area. FIGS. 14 and 15 show embodiments of that kind which moreover offer the advantage of a compact and smooth construction.

According to FIG. 14, a probe body 20 which is fastened to a holder 124 is immersed in the mass 4. That probe body contains a cup-like housing 126 of low heat-conductive material, particularly plastic as polyethylene or the like, which housing is sealingly closed by a metal lid 128. That metal lid 128 is directly in contact with the mass 4 and forms a connection of good heat conductivity to a temperature sensor 130 which may be directly soldered to the lid 128. A second temperature sensor 132 is attached to a second sensing body 134 which consists of a metal block and is separated from the housing 126 by spacers 131 of low heat conductivity, and a heat insulating material 133. At its end face which is disposed on the left side in FIG. 14, the second sensing body 134 is pressed onto the first sensing body (lid 128) with the interposition of a separating plate 136; rather, there can also be provided a rigid connection, particularly by means of an adhesive, between the sensing bodies 128 and 134 under interposition of the separating plate 136. The two temperature sensors 130 and 132 are connected opposed to each other via a line 138, whereby a signal corresponding to the temperature differential between the two sensing bodies 128, 134 will be delivered via the two-line connecting conduit 140. The connecting conduit 140 extends through a sealed screw terminal 142 from the housing 126. It will be appreciated that in the device illustrated in FIG. 14, the temperature differential which is sensed between the two sensing bodies 128 and 134 will be a measure for the rate of change of the temperature of the mass 4 because the one sensing body (lid) 128 is directly in good heat-conducting connection with the mass 4, whereas the second sensing body 134 is heat-insulated towards the mass 4 and thus is in heat exchange with the mass 4 substantially only via conduction through the separating plate 136. Both sensing bodies 128 and 134 are in heat-conducting connection with the mass via the same contacting area, namely the surface of the lid 128 which is shown in FIG. 14 on the left side of the lid.

It will be further appreciated that for devices of the kind shown in FIG. 14, it is particularly useful to employ thermo couples or thermo batteries as temperature sensors because those devices are inherently responsive to temperature differentials and are free of self-heating.

Since the heat resistance between the mass 4 and the one sensing body 128 is negligible as compared with the heat resistance between the mass 4 and the second sensing body 134, the response characteristic of the device shown in FIG. 14 will be substantially determined by the time constant of the heat-conducting connection to the second sensing body 134. That time constant may be calculated with good approximation if it is assumed that the whole heat exchange with the second sensing body 134 takes place via the separating plate 136 only, the heat capacity of which is negligibly small as compared with that of the second sensing body 134. On the other hand, the heat resistance is formed practically exclusively by the separating plate 136. The time constant then is simply the product of the heat resistance of the separating plate 136, taken acorss the contact cross-section with the second sensing body 134, and the heat capacity of the second sensing body 134. For instance, with a second sensing body 134 consisting of 10 grams of copper and having a cross-section of 1 cm$^2$, which engages a separating plate 136 of polystyrene foil of 0.2 mm thickness, a time constant of approximately 0.8 minutes will result. In that case, the sensitivity will be approximately 0.8 minutes, i.e. the resulting temperature differential between the two sensing bodies 128 and 134 will be in the maximum approximately 0.8° C. per degree per minute temperature change of the mass 4.

FIG. 15 illustrates a similar embodiment as FIG. 14. However, there is a further simplification provided in that a single unitary sensing body 144 only is used. That sensing body consists of a first area 146 which as in the embodiment of FIG. 14 forms a lid of the housing 126, a second area 148 spaced therefrom, which corresponds to the second sensing body 134 of the embodiment according to FIG. 14 and is heat-insulated from the housing 126 as in that other embodiment by means of spacers 131 and heat-insulating material 133, and a web-like connecting piece 150 which corresponds to the separating plates 136 of the embodiment according to FIG. 14 and forms a heat-conducting connection between the areas 146 and 148. As sensing elements, a plurality of thermo couples 149 are provided which are series-connected to form a thermo battery, whereby the signal voltage is correspondingly increased which is delivered via the connecting conduit 140 and which is proportional to the temperature differential between the areas 146 and 148.

Figure 16:
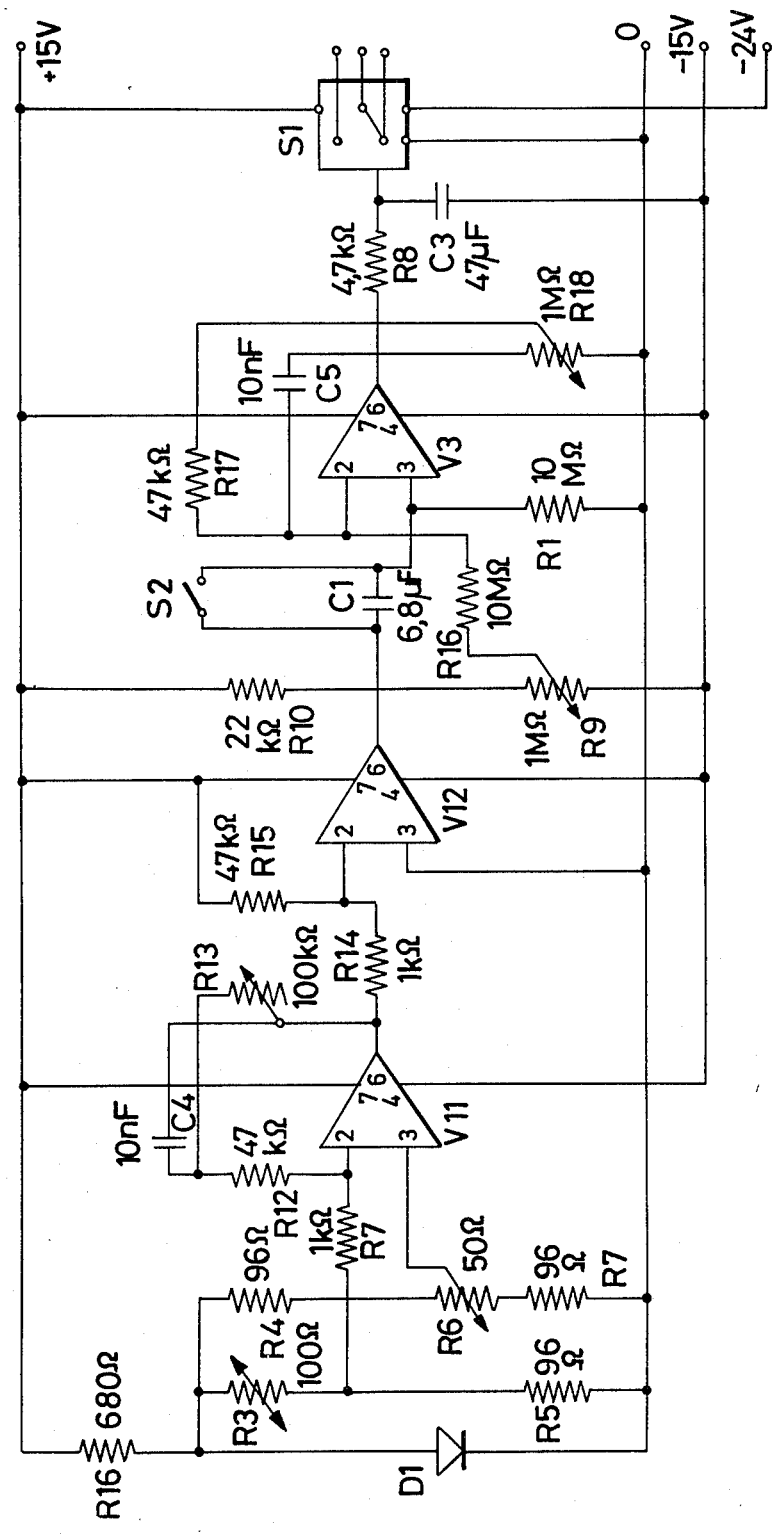

FIG. 16 shows at greater detail an evaluating circuit of the kind of the circuit shown in FIG. 7. Instead of the single amplifier V 1 illustrated in FIG. 7, the circuit according to FIG. 16 comprises two series-connected operation amplifiers V 11 and V 12. Ahead of the switching amplifier V 3, a voltage divider R 9, R 10 for adjusting the basic voltage is provided as in FIG. 8. The individual amplifiers are stabilized by negative feed back, as by the negative feed back path including resistors R 12 and R 13 and condensor C 4 in the amplifier V 11, and by resistors R 17 and R 18 and condenser C 5 in the amplifier V 3. The bridge circuit is supplied via a series resistor R 16 with a stabilizing diode D 1. The diagonal voltage is fed into the amplifier V 11 via a protective resistor R 11. The amplifiers V 11, V 12 and V 3 are commercial operational amplifiers.

In other respects, possible values for the individual circuit components are indicated in FIG. 16, whereby a closer description of FIG. 16 does not appear to be necessary.

Other embodiments are possible without leaving the scope of the invention.

What is claimed is:

1. A method for pre-crystallizing a mass of chocolate containing meltable cocoa butter fats releasing a latent heat upon crystallization, said method comprising the steps of:

establishing the temperature of the mass at a first temperature which melts the cocoa butter fats in the mass;

cooling the mass at a mild cooling rate to a second temperature, lower than said first temperature, sufficient to initiate the pre-crystallization of the mass;

sensing during cooling of the mass a reduction in the cooling rate resulting from a release of latent heat of crystallization in the mass;

terminating the cooling of the mass responsive to said reduction in the cooling rate; and mildly heating the mass to a third temperature at which pre-crystallization is complete and further processing of the mass may occur.

2. The method of claim 1 further defined as applying a cooling medium to the mass to cool the mass and wherein at least during the sensing step, the cooling medium has a constant temperature.

3. The method of claim 1 wherein the method is further defined as terminating the cooling of the mass upon a predetermined reduction in the cooling rate.

4. The method of claim 3 wherein the method is further defined as terminating the cooling when the cooling rate has been reduced to a fraction of the cooling rate obtained without the release of the latent heat.

5. The method of claim 4 wherein the method is further defined as terminating the cooling when the cooling rate has been reduced to approximately half the cooling rate obtained without the release of the latent heat.

6. The method of claim 4 wherein the method is further defined as terminating the cooling when the cooling rate has been reduced to zero.

7. The method of claim 3 further defined as applying a cooling medium to the mass to provide the cooling rate to the mass and wherein the predetermined reduction in the cooling rate at which cooling is terminated is selected in accordance with the temperature of the cooling medium.

8. The method of claim 1 wherein the sensing step is further defined as sensing the rate of change of the cooling rate and terminating the cooling upon a predetermined alteration in the rate of change of the cooling rate.

9. The method of claim 8 wherein the rate of change of the cooling rate tends to be constant prior to the release of the latent heat and wherein the method is further defined as sensing the loss of the constant rate of change in the cooling rate by the release of the latent heat heat and terminating the cooling thereupon.

10. The method of claim 2 wherein the temperature of the cooling medium is selected in accordance with the composition of the mass.

11. The method of claim 10 wherein the temperature of the cooling medium is selected in accordance with the cocoa butterfat content of the mass.

12. The method of claim 1 wherein the cooling is further defined as being carried out in a plurality of cooling stages and wherein the sensing is carried out in the last of said stages.

13. The method of claim 12 wherein, in at least the last of the cooling stages, a cooling medium is applied to the mass having a temperature slightly below the temperature at which the latent heat is released.

14. The method of claim 1 characterized as diverting a sample of the mass; cooling the sample at a mild cooling rate to a second temperature, lower than said first temperature, sufficient to initiate the pre-crystallization of the sample; sensing a reduction in the cooling rate resulting from a release of latent heat in the sample; terminating the cooling of the mass in accordance with the reduction in the cooling rate in the sample; and mildly heating the mass to the third temperature.

15. The method of claim 14 further defined as accelerating the cooling of the sample so that the temperature of the sample is below that concurrently existing in the mass.

16. The method of claim 15 wherein the acceleration of the cooling of the sample is such as to maintain a predetermined temperature differential between the sample and the mass.

17. The method according to claim 1 wherein said third temperature is intermediate said first and third temperatures.

18. The method according to claim 1 wherein said second temperature is in the range of 28°–29° C.

19. The method of claim 13 wherein the second temperature is in a range of 28°–29° C. and the temperature of the cooling medium applied during the period in which sensing is undertaken is 26° C.

20. The method according to claim 18 wherein said third temperature is in a range of 33°–34° C.

21. The method of claim 18 wherein said first temperature is in a temperature range of 45°–60° C.

22. The method of claim 20 wherein said first temperature is in a range of 45°–60° C.

* * * * *